United States Patent
Tobias et al.

(10) Patent No.: US 9,530,398 B2
(45) Date of Patent: Dec. 27, 2016

(54) METHOD FOR ADAPTIVELY SCHEDULING ULTRASOUND SYSTEM ACTIONS

(71) Applicant: White Eagle Sonic Technologies, Inc., Santa Clara, CA (US)

(72) Inventors: Richard Tobias, San Jose, CA (US); Bicheng Wu, Palo Alto, CA (US); Ashish Parikh, Los Altos, CA (US)

(73) Assignee: White Eagle Sonic Technologies, Inc., Santa Clara, CA (US)

( * ) Notice: Subject to any disclaimer, the term of this patent is extended or adjusted under 35 U.S.C. 154(b) by 393 days.

(21) Appl. No.: 14/098,444

(22) Filed: Dec. 5, 2013

(65) Prior Publication Data
US 2014/0160894 A1    Jun. 12, 2014

Related U.S. Application Data

(60) Provisional application No. 61/734,291, filed on Dec. 6, 2012, provisional application No. 61/734,067, filed on Dec. 6, 2012.

(51) Int. Cl.
*G10K 11/00*    (2006.01)
*G10K 11/18*    (2006.01)
(Continued)

(52) U.S. Cl.
CPC .............. *G10K 11/18* (2013.01); *B06B 1/0207* (2013.01); *G01S 7/52082* (2013.01);
(Continued)

(58) Field of Classification Search
CPC ..... G01K 11/18; G01S 7/52098; G01S 15/899
See application file for complete search history.

(56) References Cited

U.S. PATENT DOCUMENTS

| | | |
|---|---|---|
| 4,287,768 A | 9/1981 | Hayakawa et al. |
| 4,572,202 A | 2/1986 | Thomenius |

(Continued)

FOREIGN PATENT DOCUMENTS

| | | |
|---|---|---|
| CN | 1179298 A | 4/1998 |
| CN | 1646064 A | 7/2005 |
| WO | WO2012123942 A1 | 9/2012 |

OTHER PUBLICATIONS

U.S. Appl. No. 14/098,569 Office Action dated Nov. 4, 2015.
(Continued)

*Primary Examiner* — Luke Ratcliffe
*Assistant Examiner* — Hovhannes Baghdasaryan
(74) *Attorney, Agent, or Firm* — Blakely Sokoloff Taylor & Zafman LLP

(57) ABSTRACT

A method of adaptively scheduling ultrasound device actions starts with an electronic circuit included in an adaptive scheduler selecting a next task in a task list. The task list may include tasks scheduled to be performed by an ultrasound system. Each of the tasks may include a plurality of task actions. The electronic circuit may then determine if a task action included in the next task can start. This determination may include determining if the task action can be completed without interfering with a start of a higher priority task in the task list. When the electronic circuit determines that the next task action can start, the electronic circuit may signal to a beam associated with the task action to start and perform the task action. Other embodiments are also disclosed.

20 Claims, 2 Drawing Sheets

(51) Int. Cl.
*G01S 7/52* (2006.01)
*B06B 1/02* (2006.01)
*G01S 15/89* (2006.01)

(52) U.S. Cl.
CPC ...... *G01S 7/52085* (2013.01); *G01S 7/52098* (2013.01); *G01S 15/899* (2013.01); *F04C 2270/041* (2013.01); *G01S 15/8979* (2013.01)

(56) References Cited

U.S. PATENT DOCUMENTS

| | | | |
|---|---|---|---|
| 4,993,417 A | 2/1991 | Seo | |
| 5,119,342 A | 6/1992 | Harrison, Jr. et al. | |
| 5,121,361 A | 6/1992 | Harrison, Jr. et al. | |
| 5,140,192 A | 8/1992 | Nogle | |
| 5,641,908 A | 6/1997 | Hayakawa | |
| 5,680,865 A * | 10/1997 | Tanaka | A61B 8/06 600/441 |
| 5,709,209 A | 1/1998 | Friemel et al. | |
| 5,797,846 A | 8/1998 | Seyed-Bolorforosh et al. | |
| 5,919,138 A | 7/1999 | Ustuner | |
| 5,921,932 A | 7/1999 | Wright et al. | |
| 5,928,152 A | 7/1999 | Wright et al. | |
| 6,029,116 A | 2/2000 | Wright et al. | |
| 6,124,828 A | 9/2000 | Champeau | |
| 6,126,601 A | 10/2000 | Gilling | |
| 6,126,607 A | 10/2000 | Whitmore et al. | |
| 6,402,693 B1 | 6/2002 | Emery | |
| 6,436,049 B1 | 8/2002 | Kamiyama et al. | |
| 6,438,401 B1 | 8/2002 | Cheng et al. | |
| 6,459,925 B1 | 10/2002 | Nields et al. | |
| 6,468,212 B1 | 10/2002 | Scott et al. | |
| 6,526,163 B1 * | 2/2003 | Halmann | G01S 7/52044 382/128 |
| 6,567,687 B2 | 5/2003 | Front et al. | |
| 6,585,651 B2 | 7/2003 | Nolte et al. | |
| 6,666,833 B1 | 12/2003 | Friedman et al. | |
| 6,714,667 B1 | 3/2004 | Mooney et al. | |
| 6,839,762 B1 | 1/2005 | Yu et al. | |
| 6,980,419 B2 | 12/2005 | Smith et al. | |
| 7,022,075 B2 | 4/2006 | Grunwald et al. | |
| 7,043,063 B1 | 5/2006 | Noble et al. | |
| 7,069,425 B1 | 6/2006 | Takahashi | |
| 7,115,093 B2 | 10/2006 | Halmann et al. | |
| 7,117,134 B2 | 10/2006 | Dubois et al. | |
| 7,280,473 B2 | 10/2007 | Wu et al. | |
| 7,347,820 B2 | 3/2008 | Bonnefous | |
| 7,450,130 B2 | 11/2008 | Swedberg et al. | |
| 7,514,069 B2 | 4/2009 | Achilefu et al. | |
| 7,536,535 B2 | 5/2009 | Wood | |
| 7,648,461 B2 | 1/2010 | Thiele | |
| 7,691,063 B2 | 4/2010 | Peteresen et al. | |
| 7,846,099 B2 | 12/2010 | Lin et al. | |
| 7,850,912 B2 | 12/2010 | Favuzzi et al. | |
| 7,981,039 B2 | 7/2011 | Peteresen et al. | |
| 7,991,986 B2 | 8/2011 | Yamamoto et al. | |
| 8,057,390 B2 | 11/2011 | Witte et al. | |
| 8,081,806 B2 | 12/2011 | Friedman et al. | |
| 8,096,949 B2 | 1/2012 | Chen et al. | |
| 8,167,803 B2 | 5/2012 | McMorrow et al. | |
| 8,226,560 B2 | 7/2012 | Arai et al. | |
| 8,226,563 B2 | 7/2012 | Peteresen et al. | |
| 8,246,545 B2 | 8/2012 | Hastings et al. | |
| 8,248,885 B2 | 8/2012 | Ma et al. | |
| 8,287,471 B2 | 10/2012 | Liu et al. | |
| 8,289,284 B2 | 10/2012 | Glynn et al. | |
| 2002/0198454 A1 | 12/2002 | Seward et al. | |
| 2003/0135712 A1 | 7/2003 | Theis | |
| 2004/0006272 A1 * | 1/2004 | Vortman | A61B 8/5276 600/443 |
| 2004/0019447 A1 | 1/2004 | Shachar | |
| 2004/0250050 A1 | 12/2004 | Ludden et al. | |
| 2004/0254465 A1 | 12/2004 | Sano et al. | |
| 2005/0074154 A1 | 4/2005 | Georgescu et al. | |
| 2005/0075566 A1 | 4/2005 | Satoh | |
| 2006/0004606 A1 | 1/2006 | Wendl et al. | |
| 2006/0058673 A1 * | 3/2006 | Aase | A61B 8/08 600/450 |
| 2006/0116578 A1 | 6/2006 | Grunwald et al. | |
| 2006/0288194 A1 | 12/2006 | Lewis et al. | |
| 2007/0255139 A1 | 11/2007 | Deschinger et al. | |
| 2007/0258631 A1 | 11/2007 | Friedman et al. | |
| 2007/0258632 A1 | 11/2007 | Friedman et al. | |
| 2007/0259158 A1 | 11/2007 | Friedman et al. | |
| 2007/0260861 A1 | 11/2007 | Kaabouch et al. | |
| 2008/0033292 A1 | 2/2008 | Shafran | |
| 2008/0077820 A1 | 3/2008 | Jensen et al. | |
| 2008/0126639 A1 | 5/2008 | Oakes et al. | |
| 2008/0146922 A1 | 6/2008 | Steins et al. | |
| 2008/0242993 A1 | 10/2008 | Shin | |
| 2008/0249407 A1 | 10/2008 | Hill et al. | |
| 2008/0249410 A1 | 10/2008 | Okuno | |
| 2008/0300487 A1 | 12/2008 | Govari et al. | |
| 2009/0012394 A1 | 1/2009 | Hobelsberger et al. | |
| 2009/0043195 A1 | 2/2009 | Poland | |
| 2009/0089555 A1 | 4/2009 | Cataldo et al. | |
| 2009/0138318 A1 * | 5/2009 | Hawkins | G06F 9/5038 705/7.27 |
| 2009/0187099 A1 | 7/2009 | Burcher | |
| 2010/0016719 A1 | 1/2010 | Freiburger et al. | |
| 2010/0017750 A1 | 1/2010 | Rosenberg et al. | |
| 2010/0023886 A1 | 1/2010 | Shin et al. | |
| 2010/0312113 A1 | 12/2010 | Ogasawara et al. | |
| 2010/0324420 A1 | 12/2010 | Snook et al. | |
| 2011/0201900 A1 | 8/2011 | Zhang et al. | |
| 2011/0288413 A1 | 11/2011 | Baba et al. | |
| 2012/0092527 A1 | 4/2012 | Lavin et al. | |
| 2012/0157842 A1 | 6/2012 | Davis et al. | |
| 2012/0157843 A1 | 6/2012 | Lavin et al. | |
| 2013/0251221 A1 | 9/2013 | Harrison | |
| 2013/0263511 A1 | 10/2013 | Agam et al. | |

OTHER PUBLICATIONS

U.S. Appl. No. 14/098,472 Office Action dated Nov. 30, 2015.
U.S. Appl. No. 14/098,464 Office Action dated Jul. 16, 2015.
PCT: Notification of Transmittal of the International Search Report and the Written Opinion of the International Searching Authority, or the Declaration mailed Feb. 24, 2014 for International Application No. PCT/US2013/073554, International Filing Date Dec. 6, 2013.
U.S. Appl. No. 14/098,452 Office Action dated Feb. 5, 2016.
U.S. Appl. No. 14/098,464 Office Action dated Feb. 5, 2016.
U.S. Appl. No. 14/098,459 Office Action dated Mar. 8, 2016.
U.S. Appl. No. 14/098,469 Final Office Action dated May 18, 2016.
U.S. Appl. No. 14/098,472 Final Office Action dated May 23, 2016.
U.S. Appl. No. 14/098,472 Office Action dated Aug. 26, 2016.
CN Patent Application 201380071646.2 Office Action dated Sep. 28, 2016.

* cited by examiner

METHOD FOR ADAPTIVELY SCHEDULING ULTRASOUND SYSTEM ACTIONS

CROSS-REFERENCED AND RELATED APPLICATIONS

This application claims the benefit pursuant to 35 U.S.C. 119(e) of U.S. Provisional Application No. 61/734,291, filed Dec. 6, 2012, which application is specifically incorporated herein, in its entirety, by reference.

This application claims the benefit pursuant to 35 U.S.C. 119(e) of U.S. Provisional Application No. 61/734,067, filed on Dec. 6, 2012, which application is specifically incorporated herein, in its entirety, by reference.

TECHNICAL FIELD

Embodiments of the invention generally relate to the scheduling of actions for medical, industrial or other types of systems. More particularly, some embodiments relate to methods of adaptively scheduling actions in ultrasound systems, and more specifically, methods of scheduling ultrasound beam firing and data collection actions.

BACKGROUND

Today's ultrasound systems have limited, fixed functionality and require sophisticated user control. Most ultrasound systems cannot provide multiple simultaneous functions. The ultrasound systems which can provide multiple simultaneous functions have the functions as fixed functions that are not flexible to user demands or need for adaptation. Accordingly, in these systems, a selection between different functions may be available, but no deviations that relate to timing of the fixed function are possible. For example, in the case of ultrasound systems, it may be possible to have a Doppler beam and a B-Mode beam. The combined functions of the different beams are provided as preprogrammed solutions. These solutions are selected, for example, by using a touch of a button. However, there is no flexibility provided to the user of the system for changes that require the reconfiguring and reshuffling of the timed scheduled actions that are included in the preprogrammed solutions.

Moreover, some current imaging systems allow for combinations of, for example, a photoacoustic and ultrasound imager. These imaging systems use hardware counters to divide a clock to generate timing pulses for a transducer that supports both photoacoustic and ultrasound actions. However, these imaging systems provide little in the form of flexibility to adapt to needs of modern ultrasound imaging that may require changes that befit a specific imaging situation. Other imaging systems provide ways for continuous interleaving of, for example, ultrasound beams. However, such interleaving is limited in its flexibility and being able to address the needs of future ultrasound imaging.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

Figure 1:
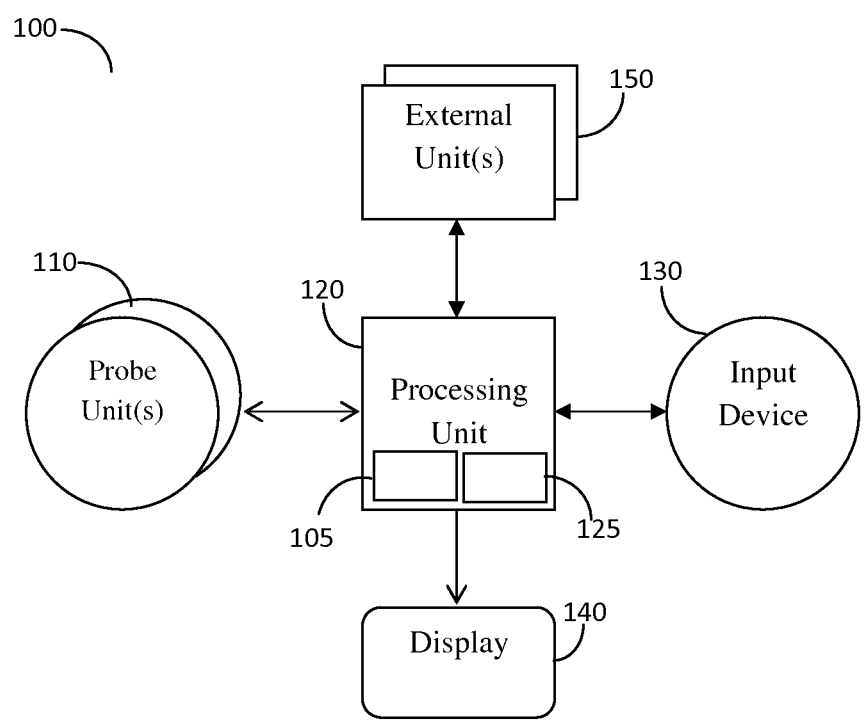
FIG. 1 shows an ultrasound system including an adaptive scheduler for adaptively scheduling ultrasound system actions according to an embodiment of the invention.

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

A sophisticated ultrasound system supports multiple simultaneous functions such as imaging, blood flow measurement and heartbeat monitoring. The ultrasound system performs these functions by executing sequences of actions such as firing beams, receiving beam data, and moving mechanical arms. These actions frequently have rigorous real-time requirements. The ultrasound system performs functions by executing one or more parallel tasks, where each task requires a sequence of actions. The ultrasound system cannot perform conflicting actions at the same time. Accordingly, in some embodiments, actions conflict if they require the same resource, e.g., the same transmitter, the same receiver or the same area of memory. In other embodiments, actions conflict if the ultrasound beams from two different transmitters travel through the same area of the target and make it impossible for a receiver to identify the source.

Further, some actions depend on events that cannot be accurately predicted. For example, the system may need to wait for a mechanical arm to complete its movement before it fires the next beam. The system must wait for a laser to be charged before it can fire a laser beam. The time taken to charge a laser varies significantly and cannot be predicted to the required accuracy. The ultrasound system indicates the completion of mechanical movement or laser charging by signaling events. Thus, some actions may depend on asynchronous events.

Accordingly, in some embodiments, the ultrasound system supports changes to the list of parallel tasks. For instance, a human user may view an ultrasound image and request new functions to be performed. An automated system may change the list of tasks in response to analysis of the ultrasound results. In some embodiments, the automated system uses the adaptive scheduler to schedule actions from the updated task list. Scheduling the actions may include signaling to a processor to send commands to other units to perform the actions. The adaptive scheduler may be implemented in hardware, software, firmware or any combination thereof as discussed below. In prior ultrasound systems, a skilled human operator is required to analyze results and modify ultrasound parameters. For example, an ultrasound operator may wish to locate a human heart valve, monitor the heart rate and measure the shape of the heart valve movement. In one embodiment of the invention, the automated system employs analysis software to monitor the ultrasound results. The analysis software determines the required task-list changes and signals an appropriate event to the adaptive scheduler. The analysis software modifies the task-list while searching for the heart valve. The analysis software starts new tasks when the ultrasound system locates the heart valve. Thus, the ultrasound system needs to respond to events that change the task list (e.g., when it receives an event indicating that the heart valve is located from the analysis software or from the end user). In this example, the event may be a signal received by the adaptive scheduler that indicates that the heart valve is located. The signal may be a single bit digital signal wherein the high signal ('1') may indicate that the heart valve is located.

Accordingly, in one embodiment of the invention, the adaptive scheduler further described below handles the scheduling of task actions. Each task to be performed may include a plurality of task actions. For instance, a task to be performed by the ultrasound system may be measuring the blood flow. The task actions included in the task of measuring the blood flow may include: firing one of the beams, and collecting the data (e.g., ultrasound data) from the beam. The adaptive scheduler adapts the schedule of task actions to ensure that actions do not conflict. When adapting the schedule of task actions, if actions are found to conflict, in one embodiment, the adaptive scheduler ensures that high priority actions are handled prior to lower priority actions. The adaptive scheduler handles events. The events may be signals received by the adaptive scheduler that indicate the completion of certain tasks or task actions. For example, when an external unit (e.g, robot arm) has completed the movement required, the event received may be a signal that indicates that the external unit has completed the movement. The events may also be a signal received from an input device that indicates that a list of tasks has been inputted by the user. In some embodiments, events can cause the adaptive scheduler to pause task actions, modify task parameters, add or delete tasks and to invoke software procedures such as analysis software for locating a heart valve. In other embodiments, in response to events, the adaptive scheduler sends a signal to the processor to send commands to probe units or external units to start executing a task action. For instance, in response to receiving an event that indicates that data has been collected from a first beam associated with a higher priority, the adaptive scheduler may signal to the processor to send a start command to the second beam of a lower priority. In some embodiments, the adaptive scheduler sends the commands to the probe units or external units instead of the processor.

FIG. 1 illustrates an ultrasound system including an adaptive scheduler for adaptively scheduling ultrasound system actions according to an embodiment of the invention. The ultrasound system 100 includes an adaptive scheduler 105 according to an embodiment. In one embodiment, the adaptive scheduler 105 is coupled to one or more probe units 110. Each probe unit 110 typically controls one or more transducers embodied therein. The transducers typically contain multiple elements capable of transmitting and receiving ultrasound beams. In one embodiment, the adaptive scheduler 105 is part of a processing unit 120 that handles user interactions, image display and system control. In one embodiment, the adaptive scheduler 105 is implemented as a software procedure executing on a processor. In some embodiments, the adaptive scheduler 105 includes a dedicated processor that is only used for adaptive scheduling. In a second embodiment the adaptive scheduler 105 is implemented in hardware. For instance, the adaptive scheduler 105 may include application-specific integrated circuit (ASIC) and/or field-programmable gate array (FPGA). The processing unit 120 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processing unit 120 may be used to control the operations of the adaptive scheduler 105. For example, the processing unit 120 may executes software to control the adaptive scheduler 105 (e.g. to transmit and receive data to other components of system 100 (e.g., external units 150, probe unit 110). In some cases, a particular function may be implemented as two or more pieces of software that are being executed by different hardware units of a processor.

In one embodiment, the processing unit 120 may send probe control commands, telling the probe units 110 when to fire specific beams and when to collect data. Such operation, as explained in further detail herein below, is performed, for example, from a memory 125 containing instructions that are executed by the processing unit 120. A memory 125 may also be included in the adaptive scheduler 120. The memory 125 that may include one or more different types of storage such as hard disk drive storage, nonvolatile memory, and volatile memory such as dynamic random access memory. The memory 125 may also include a database that stores data received from the probe units 110 and the external units 150. The memory 125 may also store instructions (e.g. software; firmware), which may be executed by the processing unit 120. The processing unit 120 is configured to further retrieve data collected by a probe unit 110 data. The processing unit 120 may also take input commands from one or more input devices 130. The input devices 130 may be a keyboard, mouse, or touch screen that allows a user to input commands. The input devices 130 typically provide high-level commands to the processing unit 120 which in turn, executes instructions stored in the embedded instruction memory 125 to perform methods of adaptively scheduling ultrasound system actions and specifically, to perform at least the tasks described in greater detail herein below. The processing unit 120 may output at least a result respective of the data collected to, for example, a display unit 140 that is coupled to the processing unit 120. A display unit 140 may be replaced or augmented by a storage unit (not shown) to allow the storing of the collected data for future use. The display unit 140 may show an image, a video comprised of a series of image frames and text, as well as combinations thereof.

In one embodiment, the ultrasound system 100 may control one or more external units 150, such as, for example, lasers, robot arms and motors. The external units 150 may also require time synchronization with probe units 110 operations. In one embodiment, the processing unit 120 sends external units 150 control commands based on the adaptive scheduler 105's selected task action as further explained below. For example, the processing unit 120 may send a control command telling a robot arm (e.g., external unit 150) to move a probe upon receipt of a signal from the adaptive scheduler 105 that has received an event indicating that a unit of data has been collected.

The ultrasound system 100 may receive a specification of ultrasound system tasks and events through, for example, input devices 130. The ultrasound system 100 generates a task identifying a sequence of task actions. Some of the task actions may have real-time constraints and some may depend on events. For instance, some task actions may not start until an event is received by the adaptive scheduler. For example, the task action may be to move a robot arm which cannot begin until an event is received that indicates that the data from a beam is finished being collected. In one embodiment, the ultrasound system 100 computes the time needed to complete each task action in the specification received. The ultrasound system 100 generates a list of the task actions using a linked list in memory 125. In some embodiments, the specification may include tasks and events that are associated with multiple beam firings of different types. A beam firing task action may require a setup time which is the amount of time needed to configure the transducer before firing a beam. The setup time may depend on the transducer. Different beam firing types are called modes. Switching modes (for example, switching from B-Mode mode to color-flow Doppler) typically requires a mode switching delay. The switching delay acts as an additional setup time. Each beam firing task action has a firing time, also known as pulse duration, which is the amount of time that the transducer outputs ultrasound waves. The firing time depends of the beam type and the purpose of the beam firing. For instance, a shorter firing time can give a better quality image. Doppler beams have a longer firing period than B-Mode beams. Each beam also has a collection time, which is the time needed to receive the reflected or pass-through ultrasound waves. The ultrasound propagation time depends on the medium through which the beam passes. The collection time depends on the depth of the scan. The ultrasound system 100 may need to distinguish the source of the collected data. Accordingly, the ultrasound system 100 may avoid two beams firing at the same time. A "dead-time" time interval between data collection and the next beam firing may also be introduced as needed.

Some beam types have a pulse repetition period which is the time between successive firings. Successive firings lead to the construction of a single image. Repeating this sequence of firings can generate multiple images. The ultrasound system 100 may, for instance, have a requirement to generate 60 images per second. Doppler beams have a pulse repetition period whereas B-mode scan beams do not.

Some beam firings need to be consecutive in time. Using multi-focal-zones allows the ultrasound system 100 to get significantly better image quality. The ultrasound system 100 scans with beams focused at different distances. The ultrasound system 100 may scan with the first beam focused at 0-5 centimeters (cm), a second beam focused at 5-10 cm and a third beam focused at 10-15 cm. The data collected from the three different levels may be combined to form one line of an image. This beam firing sequence can be repeated using different collectors to generate a complete image. The ultrasound system 100 may need to schedule the actions that generate a single line consecutively.

In one embodiment, the processing unit 120 receives an input specification including a list of tasks (or task list) to be performed that includes ultrasound tasks and external unit tasks. Each ultrasound task may include, for example: the beam type, the number of beam firings, the setup time, the firing time, the dead-time, the pulse repetition period, the desired images per second rate, the number of multi-focal zones, and other timing constraints. Each external unit function (e.g., an external unit task) may include, for example: desired external unit task actions and the desired external unit task actions' timing constraints. The desired external unit task action may be for example a movement of a robot arm. The processing unit 120 or the adaptive scheduler 105 processes each task description and produces a list of sequential task actions such as beam firing actions and data collection actions. The task list may also include a plurality of tasks that are associated with a plurality of beams of differing priority levels. In some embodiments, the plurality of tasks includes at least one of a photoacoustic laser firing task and an electrocardiogram (ECG) task.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 2:
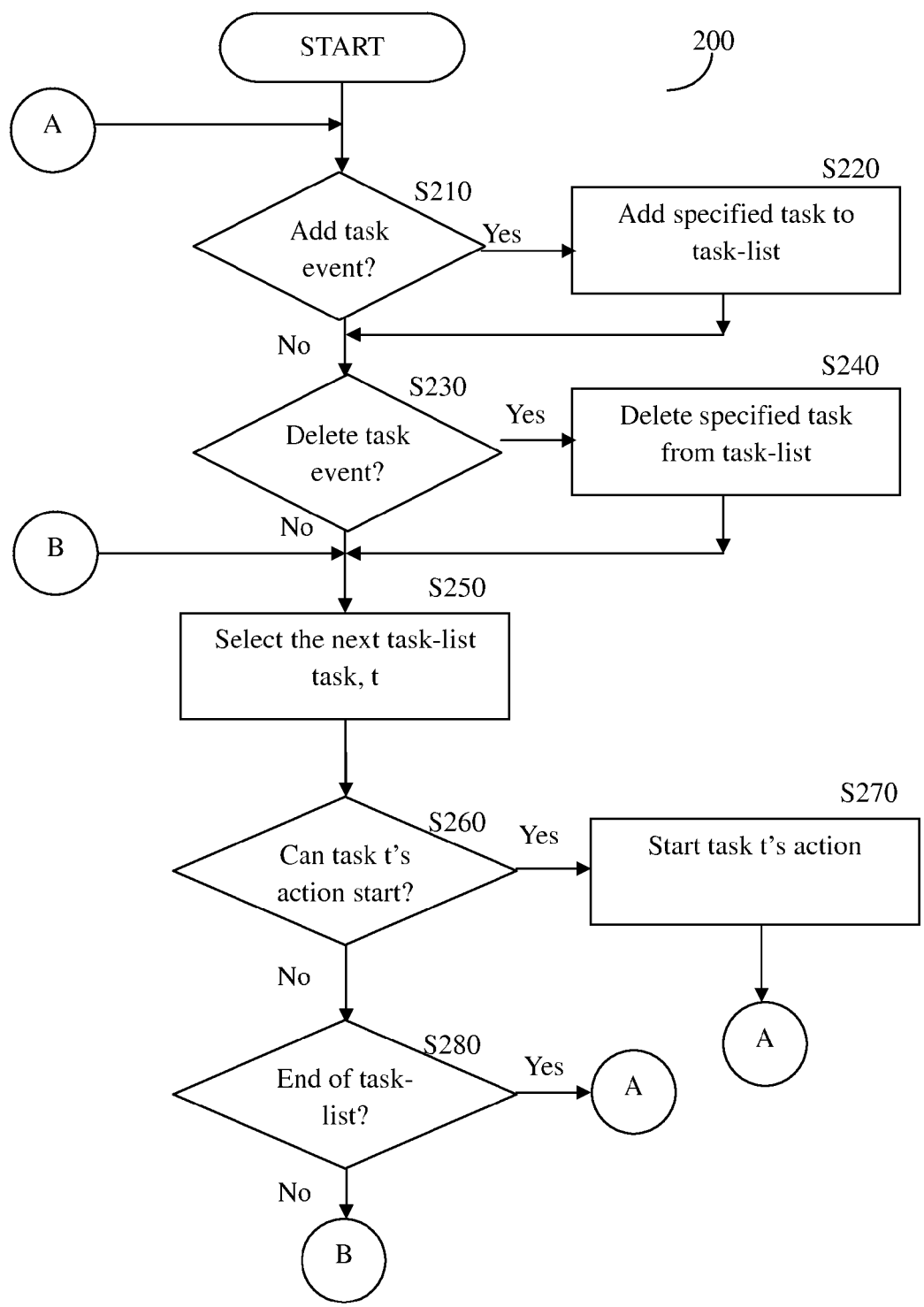
FIG. 2 shows a flowchart of an example method for adaptively scheduling ultrasound system actions according to an embodiment of the invention.

FIG. 2 shows a flowchart 200 of a method for adaptively scheduling ultrasound system actions according to an embodiment.

At S210 the adaptive scheduler checks if there are any events that require it to add new tasks to the task-list. As discussed above, the events may be signals that indicate end-user commands being received (e.g., a list of tasks being inputted by the user), commands or data from analysis software being received, hardware conditions being met (e.g., warming up of beams being completed), task and task actions being completed and other conditions being met. The adaptive scheduler checks for an event being received by reading from memory or register locations. Different events may have different memory and register locations. In one embodiment, the event may be a single bit digital signal that is stored in a given memory and register location. If event pertains to a robot arm, the single bit digital signal associated with a robot arm event being completed may be stored in the given memory and register location associated with that robot arm. If the adaptive scheduler finds an add-task event, it proceeds to S220 otherwise it proceeds to S230. At S220 the adaptive scheduler adds a new task to the task-list and then proceeds to S230. The task added depends on the type of event. For example, the task of measuring blood flow may be entered by user. This task may include the task actions of firing a beam and collecting the ultrasound data associated with the fired beam. Accordingly, in this example, the adaptive scheduler may add these task actions to the task list.

At S230 the adaptive scheduler checks if there are any events that require it to delete tasks from the task-list. If the adaptive scheduler finds a delete-task event, it proceeds to S240 otherwise it proceeds to S250. At S240 the adaptive scheduler deletes the task to the task-list and then proceeds to S250. In some embodiments, the S210, S220, S230, and S240 blocks in FIG. 2 may be performed by the processor 210 without the adaptive scheduler 105's involvement.

As shown in FIG. 2, the method allows the adaptive scheduler to iterate over the task list. At S250, the adaptive scheduler selects the next task in the task list. On the first iteration, the adaptive scheduler selects the first task. The task list may be ordered in terms of priority with the highest priority being first. At S260, the adaptive scheduler determines if it could start the next task action of the selected task. As discussed above, each task includes at least one task action. In one embodiment, starting a task action includes transmitting commands to the probe unit and/or the external unit to perform or execute the task action. In another embodiment, starting a task action includes signaling to the processing unit 120 to transmit commands to the probe unit and/or the external unit to perform or execute the task action. In one embodiment, the adaptive scheduler cannot start the next task action if the ultrasound system is currently busy performing an action for the selected task. In another embodiment, the adaptive scheduler cannot start the next action if that action will interfere with an action of a higher priority task. More specifically, the adaptive scheduler may determine if the next task action of the selected task can complete before any conflicting, higher priority task's action needs to start. In one embodiment, the adaptive scheduler may analyze the timing parameters associated with the tasks to determine whether it may start the next task action. If the adaptive scheduler determines that it can start the selected task's next action, the method proceeds to S270, otherwise the method proceeds to S280. At S270, the adaptive scheduler starts the selected task's next action. After S270, the method then proceeds to S210.

At S280 the adaptive scheduler determines if it has completed iterating over the task list. If, at S280, the adaptive scheduler determines that it has not completed iterating over the task list, the method returns to S250 where the adaptive scheduler selects the next task to be processed. If the adaptive scheduler has completed iterating over the task list, the method proceeds to S210.

To further illustrate the operation of the method of FIG. 2 the following example provides a non-limiting illustration of the operation according to flowchart 200. In this example, the ultrasound system is firing color flow Doppler beams which have a pulse repetition interval and rigorous real-time requirements. An end-user decides to start B-mode beams from a probe attached to a mechanical arm. The B-mode beams are targeted at the same area of the body as the color flow Doppler beams. B-mode beams do not have rigorous real-time requirements and have a lower priority than color flow Doppler beams. At S210, the adaptive scheduler tests for an add-task event and finds there is an add-task event. At S220, the adaptive scheduler adds the B-mode beam task to the task list. At S250, the adaptive scheduler will select the higher priority color flow Doppler task from the task list. At S260, the adaptive scheduler determines that it can start the next color flow Doppler task action and at S270, it starts the next color flow Doppler task action. The method then proceeds to S210. In this example, no other task event is added or deleted in this iteration (at S210 and S230), and the adaptive scheduler selects the next color flow Doppler task action at S250. At S260, the adaptive scheduler determines that it cannot start the next color flow Doppler task action because the system is busy with the previous color flow Doppler task action (i.e., the color flow Doppler task action from the previous iteration). In this example, the adaptive scheduler then determines that it has not reached the end of the task list at S280 and the adaptive scheduler continues to iterate over the task-list. Specifically, the method returns to S250 for the adaptive scheduler to select the next task in the task list. In this example the next task in the task list is the B-mode task action. At S260, the adaptive scheduler determines if it can start a B-mode task action. In this example, the adaptive scheduler determines that it cannot start the B-mode task action because it would conflict with the higher priority color flow Doppler task action that is in progress. In this example, after the color flow task actions for the first beam firing and reception have completed, the adaptive scheduler can start a B-mode task action.

Further, in this example, after the initial B-mode beam firings, the image analysis software may determine that the system should move a mechanical arm. The image analysis software generates an event that causes the adaptive scheduler to determine at S210 to add a new task to the task-list at S220. For instance, the new task involves a mechanical arm movement such that the adaptive scheduler will make the B-mode task wait until it receives a mechanical arm movement complete event. After the adaptive scheduler has received the mechanical arm movement complete event, it determines if it can start the next B-mode task action at S260. The adaptive scheduler will not start the next B-mode task action if a color flow Doppler task action is taking place or if the B-mode task action cannot complete before the next color flow Doppler task action needs to take place.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A method of adaptively scheduling ultrasound device actions comprising:
   selecting by an electronic circuit included in an adaptive scheduler a next task in a task list, wherein the task list includes a plurality of tasks scheduled to be performed by an ultrasound system, wherein each of the tasks includes a plurality of task actions that is used by an adaptive scheduler for adaptive scheduling, wherein the plurality of task actions include a plurality of parallel ultrasound task actions, wherein at least one of the ultrasound task actions include a timed beam firing sequence, wherein the plurality of task actions are associated with the at least one probe unit;
   adaptively modifying by the electronic circuit the task list based on signals received from an input device or from a receiver, wherein adaptively modifying the task list includes:
      determining by the electronic circuit if a task action included in the next task can start, wherein determining if the task action can start includes determining if the task action can be completed without interfering with a start of a higher priority task in the task list; and signaling by the electronic circuit to a beam associated with the task action to start and perform the task action upon determination that the next task action can start.

2. The method of claim 1, further comprising:
determining by the electronic circuit whether the end of the task list has been reached upon determination that the next task action cannot start; and
selecting by the electronic circuit a task that follows the next task in the task list upon determination that the end of the task list has not been reached.

3. The method of claim 1, wherein the plurality of tasks includes a first beam task being a task associated with a first beam and a second beam task being a task associated with a second beam, the first beam having a higher priority level than the second beam.

4. The method of claim 1, wherein determining if the task action can start includes:
determining if the task action depends on receiving an event from at least one of a probe unit or an external device; and
determining if the event has been received upon determination that the task action depends on receiving the event.

5. The method of claim 4, wherein the event is a signal received by the adaptive scheduler that indicates a completion of a task action by at least one of the probe unit or the external device.

6. The method of claim 4, wherein the event is a signal received by the adaptive scheduler that indicates that a list of tasks has been modified at the request of a user.

7. The method of claim 4, wherein upon receipt of the event, the adaptive scheduler performs at least one of: pausing task actions, modifying task parameters, adding tasks, deleting tasks, or invoking software procedures.

8. The method of claim 4, wherein while the beam associated with the task action starts and performs the task action, upon receipt of the event, the adaptive scheduler performs at least one of: pausing task actions, modifying task parameters, adding tasks, deleting tasks, or to invoking software procedures.

9. The method of claim 1, wherein determining if the task action can start includes:
analyzing timing constraints associated with the task action and timing constraints associated with the higher priority task in the task list.

10. The method of claim 1, wherein the plurality of tasks includes a photoacoustic laser firing task or an electrocardiogram task.

11. The method of claim 1, wherein the task list includes, for each of the plurality of tasks, an identification of one of the plurality of beams and at least one of: a number of beam firing actions, a setup time, a firing time, a dead-time, a pulse repetition period, a desired rate of images per second, or a number of multifocal zones.

12. The method of claim 11, wherein the identification of the one of the plurality of beams is a beam type of the one of the plurality of beams.

13. A non-transitory storage device, having stored therein instructions, when executed by a processor, causes the processor to perform a method of adaptively scheduling ultrasound device actions, the method comprising:
selecting a next task in a task list, wherein the task list includes a plurality of tasks scheduled to be performed by an ultrasound system, wherein each of the tasks includes a plurality of task actions that is used by an adaptive scheduler for adaptive scheduling, wherein the plurality of task actions include a plurality of parallel ultrasound task actions, wherein at least one of the ultrasound task actions include a timed beam firing sequence, wherein the plurality of task actions are associated with the at least one probe unit;
adaptively modifying by the electronic circuit the task list based on signals received from an input device or from a receiver, wherein adaptively modifying the task list includes:
determining if a task action included in the next task can start, wherein determining if the task action can start includes determining if the task action can be completed without interfering with a start of a higher priority task in the task list; and
signaling to a beam associated with the task action to start and perform the task action upon determination that the next task action can start.

14. The non-transitory storage device of claim 13, wherein the instructions stored therein, when executed by the processor, causes the processor to perform the method further comprising:
determining whether the end of the task list has been reached upon determination that the next task action cannot start; and
selecting a task that follows the next task in the task list upon determination that the end of the task list has not been reached.

15. The non-transitory storage device of claim 13, wherein the plurality of tasks includes a first beam task being a task associated with a first beam and a second beam task being a task associated with a second beam, the first beam having a higher priority level than the second beam.

16. The non-transitory storage device of claim 13, wherein determining if the task action can start includes:
determining if the task action depends on receiving an event from at least one of a probe unit and an external device; and
determining if the event has been received upon determination that the task action depends on receiving the event.

17. The non-transitory storage device of claim 16, wherein the event is a signal received that indicates a completion of a task action by at least one of the probe unit and the external device.

18. The non-transitory storage device of claim 17, wherein the event is a signal received that indicates that a list of tasks has been inputted by the user.

19. The non-transitory storage device of claim 17, wherein the instructions stored therein, when executed by the processor, causes the processor to perform the method further comprising:
while the beam associated with the task action starts and performs the task action, upon receipt of the event, performing at least one of: pausing task actions, modifying task parameters, adding tasks, deleting tasks, or to invoking software procedures.

20. The non-transitory storage device of claim 13, wherein determining if the task action can start includes:
analyzing timing constraints associated with the task action and timing constraints associated with the higher priority task in the task list.

* * * * *